United States Patent [19]

Satoh et al.

[11] 4,417,768

[45] Nov. 29, 1983

[54] BRAKING OIL PRESSURE CONTROL DEVICE FOR AN ANTI-SKID BRAKE SYSTEM

[75] Inventors: Makoto Satoh, Kamifukuoka; Yoshitaka Miyakawa, Kawagoe; Etsuo Fujii, Wako; Shohei Matsuda, Ooi, all of Japan

[73] Assignee: Honda Giken Kogyo Kabushiki Kaisha, Tokyo, Japan

[21] Appl. No.: 282,000

[22] Filed: Jul. 10, 1981

[30] Foreign Application Priority Data

Jul. 25, 1980 [JP] Japan .................................. 55-102123

[51] Int. Cl.³ .............................................. B60T 8/00
[52] U.S. Cl. ...................................... 303/113; 60/586; 303/92
[58] Field of Search ................. 188/181 A; 303/9, 85, 303/92, 113, 114, 117, 119; 60/586, 588, 589, 592

[56] References Cited

U.S. PATENT DOCUMENTS 2,868,338 1/1959 Lucien et al. .................... 188/181 A
3,276,207 10/1966 Peeples .................... 60/586
4,027,924 6/1977 Kondo .................... 303/92

Primary Examiner—Duane A. Reger
Attorney, Agent, or Firm—Posnack, Roberts, Cohen & Spiecens

[57] ABSTRACT

A braking oil pressure control device for a hydraulically operated anti-skid brake system comprising a pair of serially aligned first and second cylinder chambers defined in a cylinder body on the opposite sides of a partition wall. The first cylinder chamber is divided by a brake piston on the opposite sides thereof into a first brake chamber communicating with a brake master cylinder and a second brake chamber communicating with a wheel brake such that when the pressure in the first brake chamber is pressurized under the action of the master cylinder, the brake piston is moved to pressurize the second brake chamber for actuation of the wheel brake. A control piston is slidably received in the second cylinder chamber and cooperates with the partition wall to define a control chamber communicating with an anti-skid brake control hydraulic circuit. The control piston is connected with the brake piston such that when the control chamber is pressurized by the anti-skid control hydraulic circuit, the control piston is moved together with the brake piston in the direction of reducing an excessive brake pressure in the second brake chamber. A supplementary oil chamber leading to an oil reservoir is formed in the cylinder body and communicates via the second brake chamber with a first seal cup permitting a unidirectional flow of operating oil from the supplementary chamber to the second brake chamber. A second seal cup is interposed between the first and second brake chambers for permitting a unidirectional flow of operating oil from the first brake chamber to the second brake chamber.

13 Claims, 1 Drawing Figure

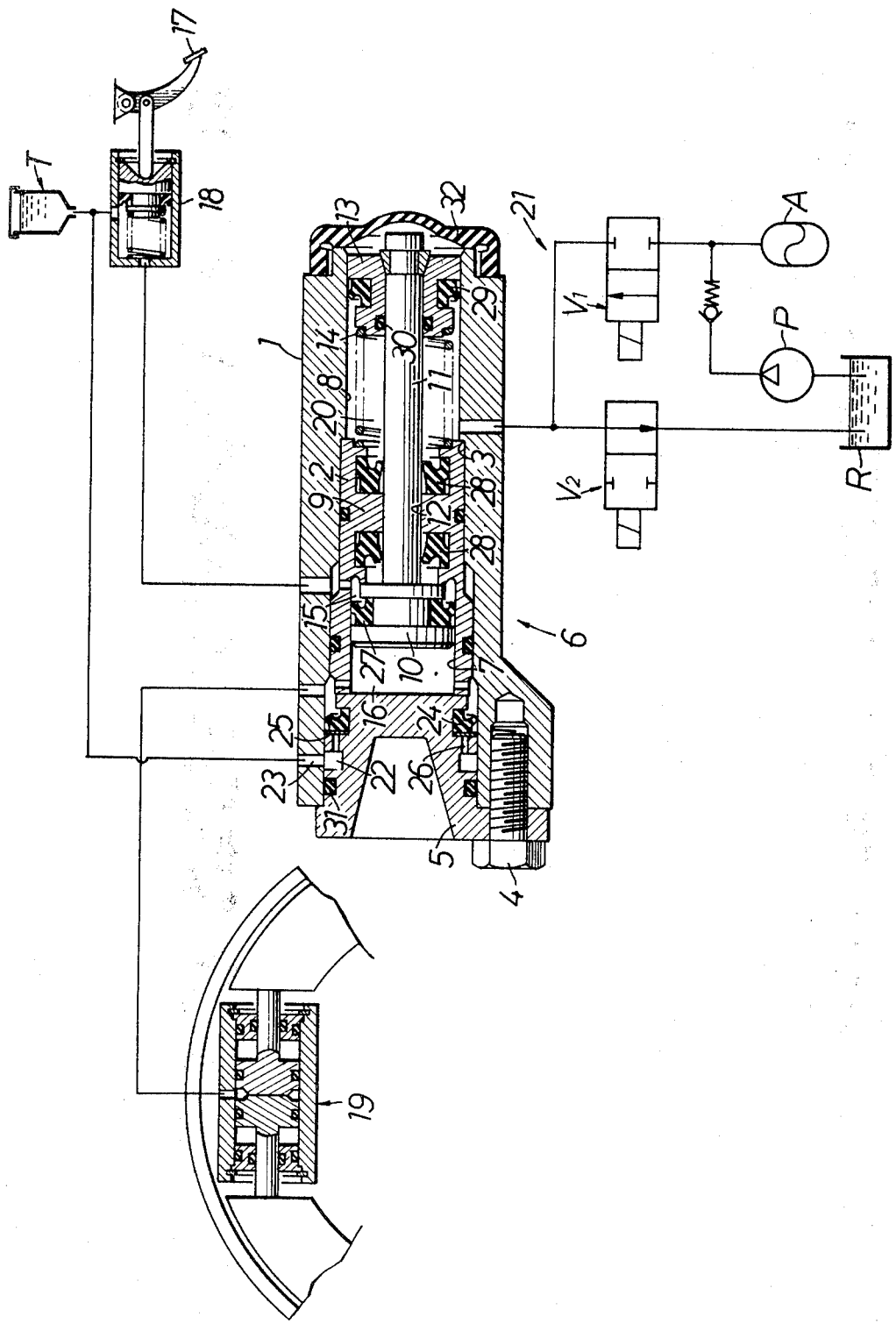

BRAKING OIL PRESSURE CONTROL DEVICE FOR AN ANTI-SKID BRAKE SYSTEM

BACKGROUND OF THE INVENTION (a) Field of the Invention

This invention relates to a device for applying the brakes of vehicle with a high level of efficiency without allowing the wheels of the vehicle to skid on the road surface when braking is applied during running of the vehicle. More particularly, the present invention relates to a braking oil pressure control device for an anti-skid brake system which is disposed in an oil passage between a master cylinder and a wheel cylinder of a wheel brake to control the brake pressure fed to the wheel cylinder.

(b) Prior Art

Various braking oil pressure control devices for an anti-skid brake system for a vehicle have heretofore been proposed. Among them, one type of braking oil pressure control device which can also be adapted for use with an anti-skid brake system for controlling four wheels of small-sized vehicles is constructed such that under normal braking operation, a piston is moved by a braking oil pressure generated by a master cylinder to feed pressurized oil into the wheel cylinder for actuation of a wheel brake, and when the braking force applied to a wheel by the wheel brake is excessive, the piston is moved in the opposite direction by the oil pressure from a control oil pressure circuit so that the oil pressure inside the wheel cylinder is reduced to restrict the braking operation of the wheel brake.

SUMMARY OF THE INVENTION

The present invention provides a braking oil pressure control device for an anti-skid brake system of the character as described, which is capable of ensuring the proper and stabilized operation of the brake system at all times irrespective of a volumetric change of operating oil due to temperature variations or the like.

BRIEF DESCRIPTION OF THE DRAWING

The accompanying sole drawing is a longitudinal sectional view showing an embodiment of the braking oil pressure control device for the anti-skid brake system in accordance with the present invention.

DESCRIPTION OF THE PREFERRED EMBODIMENT

Referring to the drawing, a fixed sleeve 2 is inserted into a cylinder casing 1 via an O-ring and is held in position by a stepped shoulder 3 of the casing 1 and a piston stopper 5 which is fixed by a locking bolt 4 to the forward end portion (the extreme left-hand portion in the drawing) of the casing 1. A cylinder body 6 is defined by the casing 1, fixed sleeve 2 and piston stopper 5. The fixed sleeve 2 is provided with a partition wall or end wall 9 that separates the interior of the cylinder body 6 into a first cylinder chamber 7 and a second cylinder chamber 8 arranged in series with each other. A braking piston 10 is disposed inside the first cylinder chamber 7 in sliding contact therewith, and a piston rod 11 extends from the braking piston 10 to the second cylinder chamber 8 through an opening 12 in the partition wall 9. A control piston 13 is fixed to the free end portion of the piston rod 11. Accordingly, the braking piston 10 and the control piston 13 move integrally with each other. A return spring 14 is disposed in the compressed state inside the second cylinder chamber 8 in such a manner as to urge the control piston 13 in its retreating direction or to the right in the drawing and hence, the braking piston 10 is also urged in the retreating direction.

A first braking oil pressure chamber 15 is defined by the braking piston 10 and the partition wall 9 inside the first cylinder chamber 7 and a second braking oil pressure chamber 16 is defined at the forward portion of the braking piston 10, that is, between the piston stopper 5 and the braking piston. The first braking oil pressure chamber 15 is connected to a master cylinder 18 which generates a braking oil pressure upon operation of a brake pedal 17, while the second braking oil pressure chamber 16 is connected to a wheel cylinder 19 of a wheel brake. A control oil pressure chamber 20 is defined by the control piston 13 and the partition wall 9 inside the second cylinder chamber 8 and is connected to a control oil pressure circuit 21. The control oil pressure circuit 21 consists of a first circuit which sucks operation oil from an oil reservoir R and feeds it to an accumulator A by means of an oil pressure pump P and is connected to the control oil pressure chamber 20 via a normally-closed inlet valve $V_1$, and a second circuit connected from the control oil pressure chamber 20 to the oil reservoir R via a normally-open outlet valve $V_2$.

A supplementary oil chamber 22 is defined inside the cylinder body 6 at the front of the second braking oil pressure chamber 16 in the piston stopper 5. This supplementary oil chamber 22 is connected to an oil reservoir T which supplements the operation oil to the master cylinder 18 via a supply port 23 in the cylinder casing 1. A seal cup 24 is interposed between the supplementary oil chamber 22 and the first cylinder chamber 7 in order to prevent leakage of the operation oil between the cylinder casing 1 and the piston stopper 5. A spacer 25 consisting of a resilient thin plate is disposed on the back of seal cup 24. An oil feed hole 26 is so bored in the piston stopper 5 as to communicate with the back of spacer 25. The seal cup 24 is a resilient ring which has a cross-sectional shape opening towards the second braking oil pressure chamber 16 and is so constructed that when the braking control oil pressure chamber 16 is at a high pressure, it prevents the outflow of the operation oil from the pressure chamber 16 but when the chamber 16 is at a lower pressure than in the supplementary feed oil chamber 22, the seal cup 24 undergoes deformation and sucks the operation oil from the supplementary oil chamber 22.

A seal cup 27 is likewise disposed in the braking piston 10, to prevent the outflow of the operation oil from the first braking oil pressure chamber 15 to the second braking oil pressure chamber 16. The seal cup 27 is of the same construction as seal cup 24 and permits the inflow of the operation oil from the second braking oil pressure chamber 16 to the first braking oil pressure chamber 15.

Seal cups 28, 28 are interposed between the fixed sleeve 2 and the piston rod 11 in order to prevent leakage of the operation oil through the opening 12 in the partition wall 9, and a seal cup 29 and an O-ring 30 are disposed on the control piston in order to prevent leakage of the operation oil from the control oil pressure chamber 20 to the outside. Further, an O-ring 31 is disposed between the cylinder casing 1 and the piston stopper 5 at a position which is more outward than the supplementary feed oil chamber 22 to prevent leakage of the operation oil from the chamber 22 to the outside. The rear end portion of the cylinder body 6 is sealed by a dust seal 32.

The control device in this embodiment operates in the following manner. When braking is not applied, the first braking oil pressure chamber 15 is held at atmospheric pressure via the master cylinder 18 and the oil reservoir T. Accordingly, the braking piston 10 is held at its rearmost position by the resiliency of the return spring 14 applied to the control piston 13 which is integral with the braking piston 10.

When a braking oil pressure is produced in the master cylinder 18 as the brake pedal 17 is operated during running of the vehicle, the oil pressure is introduced into the first braking oil pressure chamber 15, thereby elevating the oil pressure inside the oil pressure chamber 15. In this instance, the seal cup 27 is expanded and pushed against the wall surface of first cylinder chamber 7, thereby preventing the outflow of the operation oil from the first braking oil pressure chamber 15 to the second braking oil pressure chamber 16. Accordingly, the braking piston 10 advances against the resiliency of the return spring 14 and feeds the operation oil inside the second braking oil pressure chamber 16 into the wheel cylinder 19 of the wheel brake. As a result, the oil pressure inside the wheel cylinder 19 elevates and the wheel brake is actuated, thereby applying a brake torque to the wheel. In this case, the pressure inside the second braking oil pressure chamber 16 elevates and expands the seal cup 24, thereby preventing outflow of the operation oil and pushing the spacer 25 to close the opening of the oil feed hole 26.

The above describes the normal braking operation. When the pressure inside the wheel cylinder 19 elevates and the brake torque becomes so excessive that the wheel is about to skid on the road surface, however, the control oil pressure circuit 21 is actuated by a signal from an instruction device to open the inlet valve $V_1$ and to close the outlet valve $V_2$. Accordingly, operation oil of the high pressure is introduced from the accumulator A into the control oil pressure chamber 20, and this oil pressure pushes the control piston 13 and moves it backwardly against the oil pressure inside the first braking oil pressure chamber 15. As a result, the volume of the second braking oil pressure chamber 16 increases, thereby lowering the pressure inside the wheel cylinder 19. Hence, the brake torque to the wheel brake decreases and skid of the wheel can be avoided. As the pressure inside the first braking oil pressure chamber 15 further elevates and since the pressure inside the second braking oil pressure chamber 16 may not be reduced below the atmospheric pressure, the seal cups 24 and 27 are still kept expanded so that no inflow or outflow of the operation oil occurs.

When the skid is avoided, the inlet valve $V_1$ and the outlet valve $V_2$ are returned to their normal closed and open positions respectively by the signal from the instruction device, thereby reducing the pressure inside the control oil pressure chamber 20. As a result, the brake torque of the wheel brake again increases. Since the abovementioned operation is repeated at a high speed, the wheel is applied with a brake force with a high level of efficiency without causing skid.

When it is desired to keep constant the braking pressure, an arrangement may be so made to keep both inlet and outlet valves $V_1$, $V_2$ closed. According to this arrangement, since the oil pressure lock is effected by the operation oil inside the control oil pressure chamber 20, the braking pressure does not exceed a predetermined level even if the brake pedal 17 is kept depressed.

When the brake pedal 17 is released to stop the braking operation, the first braking oil pressure chamber 15 is allowed to return to atmospheric pressure and the braking piston 10 retreats due to the biasing force of the return spring 14 acting upon the control piston 13 that is integral with the braking piston 10. In this instance, if the volume of the operation oil decreases due to leakage of the operation oil from the wheel cylinder 19 or the like during braking, the pressure inside the second braking oil pressure chamber 16 drops below atmospheric pressure. If the internal pressure of the second braking oil pressure chamber 16 thus becomes lower than the pressure of the supplementary oil chamber 22 held at atmospheric pressure, the spacer 25 undergoes deformation towards the second braking oil pressure chamber 16 and at the same time, the outer circumferential portion of the seal cup 24 outwardly deflects and defines a gap between it and the inner wall surface of the cylinder casing 1. Accordingly, the operation oil is fed into the second braking oil pressure chamber 16 from the supplementary feed oil chamber 22 through the oil feed hole 26, and a predetermined quantity of the operation oil constantly fills the oil pressure circuit extending from the second braking oil pressure chamber 16 to the wheel cylinder 19. Thus, the stable braking operation can be ensured. Needless to say, the oil is fed from the oil reservoir T to the first braking oil pressure chamber 15 through the master cylinder 18.

In the anti-skid brake system of this kind, the volume of the operation oil is likely to increase due to increase of its temperature. Due to the drastic retreat of the brake piston 13, the excessive operation oil is also likely to be sucked into the second braking oil pressure chamber 16. In these cases, the internal pressure of the second braking oil pressure chamber 16 exceeds the atmospheric pressure even if the first braking oil pressure chamber 15 is exposed to the atmosphere. Accordingly, the operation oil inside the second braking oil pressure chamber 16 leaks from the gap between the brake piston 10 and the inner wall surface of the first cylinder chamber 7 and flows into the first braking oil pressure chamber 15 through a gap that is formed when the outer circumferential portion of the seal cup 27 deflects. The excessive operation oil thus flowing into the first braking oil pressure chamber is returned to the oil reservoir T through the master cylinder 18.

If the operation oil whose volume expands due to temperature rise undergoes shrinkage due to subsequent temperature drop and the volume becomes thus insufficient, the pressure of the second braking oil pressure chamber 16 falls below atmospheric pressure and the oil is supplemented from the supplementary oil chamber 22, in the same way as in the case when the operation oil leaks.

According to the abovementioned arrangement, the device of the present invention can cope with the expansion and shrinkage of the operation oil due to temperature changes or its leakage, notwithstanding the fact that the circuit connecting the second braking oil pressure chamber 16 to the wheel cylinder 19 is substantially a closed circuit.

As described in the foregoing, the braking oil pressure control device in accordance with the present invention includes the supplementary oil pressure chamber 22 which is disposed at the forward portion of the second braking oil pressure chamber in fluid communication with the oil reservoir T; the seal cup 24 which is interposed between the supplementary oil chamber 16 and the second braking oil pressure chamber for preventing the outflow of operation oil from the second braking oil pressure chamber but permitting the inflow of operation oil into the second braking oil chamber; and the seal cup 27 which is interposed between the first and second braking oil pressure chambers for preventing the outflow of operation oil from the first braking oil pressure chamber but permitting the in-flow of pressure oil into the first braking oil pressure chamber. Accordingly, even if the leakage or excessive supply of the operation oil or expansion or shrinkage of the volume of the operation oil due to temperature changes occurs, operation oil is supplied to or discharged from the second braking oil pressure chamber in response to such situations so that the pressure inside the wheel cylinder can be kept constant when braking is not applied. Thus, the present invention provides the brake oil pressure control device for the anti-skid braking system which operates in a stable manner without causing drag or air suction.

What is claimed is:

1. In an anti-skid brake system including: a cylinder body; first and second cylinder chambers serially disposed in said cylinder body on opposite sides of a partition wall; a brake piston slidable in said first cylinder chamber and defining on one side thereof a first braking oil pressure chamber communicating with a master cylinder to receive operating oil therefrom and on the other side a second braking oil pressure chamber containing operating oil and communicating with a wheel cylinder of a wheel brake; a reservoir for operating oil connected to said master cylinder; and a control piston slidable in said second cylinder chamber and cooperating with said partition wall to define therebetween a control oil pressure chamber which is in communication with a control oil pressure circuit, said control piston being connected to said brake piston such that when control oil is supplied from said control oil pressure circuit to said control oil pressure chamber, said control piston is moved together with said brake piston in a direction to reduce excessive brake pressure in said second braking oil pressure chamber;

a braking oil pressure control device for the anti-skid brake system comprising: a supplementary oil chamber in said cylinder body communicating with said second braking oil pressure chamber and said oil reservoir; a first seal cup interposed between said supplementary oil chamber and said second braking oil pressure chamber for preventing outflow of the operating oil from said second braking oil pressure chamber to said supplementary oil chamber but permitting inflow of operating oil from said supplementary oil chamber into said second braking oil pressure chamber; and a second seal cup interposed between said first braking oil pressure chamber and said second braking oil pressure chamber for preventing outflow of operating oil from said first braking oil pressure chamber to said second braking oil pressure chamber but permitting inflow of operating oil from said second braking oil pressure chamber to said first braking oil pressure chamber.

2. A braking oil pressure control device according to claim 1, wherein said cylinder body has a stepped cylinder bore and includes a fixed sleeve fitted in said stepped cylinder bore and having said partition therein defining on the opposite sides thereof said first and second cylinder chambers, and a piston rod extending through said partition and connected to said brake and control pistons.

3. A braking oil pressure control device according to claim 2, wherein said cylinder body further comprises a piston stopper securely fitted in said stepped cylinder bore at one end thereof, said sleeve having one end in abutting engagement with a shoulder of said stepped cylinder bore and another end in abutting engagement with said piston stopper.

4. A braking oil pressure control device according to claim 3, wherein said piston stopper is provided with an annular groove in the outer periphery thereof which is closed by said cylinder body and constitutes said supplementary oil chamber said first seal cup being mounted on the outer periphery of said piston stopper.

5. A braking oil pressure control device according to claim 4 wherein said piston stopper is provided with a feed hole communicating with said supplementary oil chamber and opening into said second braking oil pressure chamber, said first seal cup normally blocking said feed hole.

6. A braking oil pressure control device according to claim 5 comprising a resilient plate secured to said first seal cup and facing said feed hole.

7. An anti-skid brake system adapted for connection between a master cylinder having a reservoir for operating oil and a wheel cylinder of a wheel brake, said anti-skid brake system comprising a cylinder body including a partition wall; first and second cylinder chambers serially disposed in said cylinder body on opposite sides of said partition wall; a brake piston slidable in said first cylinder chamber and defining on one side thereof a first braking oil pressure chamber communicating with the master cylinder and on the other side a second braking oil pressure chamber communicating with the wheel cylinder of the wheel brake; a control piston slidable in said second cylinder chamber and cooperating with said partition wall to define therebetween a control oil pressure chamber; means connecting said brake piston and control piston; control means including an oil pressure circuit connected to said control oil pressure chamber for supplying control oil to said control oil pressure chamber to move said control piston and said brake piston therewith to reduce brake pressure in said second braking oil pressure chamber;

a supplementary oil chamber in said cylinder body communicating with said second braking oil pressure chamber and said oil reservoir; first one-way seal means interposed between said supplementary oil chamber and said second braking oil pressure chamber for preventing outflow of operating oil from said second braking oil pressure chamber to said supplementary oil chamber but permitting inflow of operating oil from said supplementary oil chamber into said second braking oil pressure chamber; and second one-way seal means interposed between said first braking oil pressure chamber and said second braking oil pressure chamber for preventing outflow of operating oil from said first braking oil pressure chamber to said second braking oil pressure chamber but permitting inflow of operating oil from said second braking oil pressure chamber to said first braking oil pressure chamber.

8. An anti-skid brake system as claimed in claim 7 wherein said first and second one-way seal means comprises respective seal cups.

9. An anti-skid brake system as claimed in claim 8 wherein said cylinder body has a stepped cylinder bore and includes a fixed sleeve fitted in said stepped cylinder bore and having said partition wall therein defining on the opposite sides thereof said first and second cylinder chambers, said means connecting said brake and control pistons comprising a piston rod extending through said partition wall.

10. An anti-skid brake system as claimed in claim 9 wherein said cylinder body further comprises a piston stopper securely fitted in said stepped cylinder bore at one end thereof, said sleeve having one end in abutting engagement with a shoulder of said stepped cylinder bore and another end in abutting engagement with said piston stopper.

11. An anti-skid brake system as claimed in claim 10 wherein said piston stopper is provided with an annular groove in the outer periphery thereof which is closed by said cylinder body and constitutes said supplementary oil chamber, said first seal cup being mounted on the outer periphery of said piston stopper.

12. An anti-skid brake system as claimed in claim 11 wherein said piston stopper is provided with a feed hole communicating with said supplementary oil chamber and opening into said second braking oil pressure chamber, said first seal cup normally blocking said feed hole.

13. An anti-skid brake system as claimed in claim 12 comprising a resilient plate secured to said first seal cup and facing said feed hole.

* * * * *